United States Patent [19]

Morisawa et al.

[11] Patent Number: 5,525,117
[45] Date of Patent: Jun. 11, 1996

[54] GEAR TRANSMISSION FOR AUTOMATIC TRANSMISSIONS

[75] Inventors: Kunio Morisawa; Ryuji Ibaraki, both of Toyota; Hideaki Otsubo, Susono, all of Japan

[73] Assignee: Toyota Jidosha Kabushiki Kaisha, Toyota, Japan

[21] Appl. No.: 337,441

[22] Filed: Nov. 8, 1994

[30] Foreign Application Priority Data

Nov. 8, 1993 [JP] Japan ................... 5-302363

[51] Int. Cl.⁶ .................. F16H 3/62; F16H 57/02; F16H 57/04
[52] U.S. Cl. .................. 475/281; 475/285; 475/205; 475/206; 475/340; 74/606 R
[58] Field of Search .................. 475/204, 205, 475/206, 280, 281, 284, 285, 340; 74/606 R

[56] References Cited

U.S. PATENT DOCUMENTS

| | | |
|---|---|---|
| 4,631,983 | 12/1986 | Morisawa et al. . |
| 4,722,242 | 2/1988 | Miura et al. ............ 74/606 R |
| 4,784,018 | 11/1988 | Okada et al. . |
| 4,817,474 | 4/1989 | Morisawa . |
| 4,950,213 | 8/1990 | Morisawa . |
| 4,955,852 | 9/1990 | Morisawa . |
| 5,133,697 | 7/1992 | Hattori ............ 475/281 X |

FOREIGN PATENT DOCUMENTS

| | | | |
|---|---|---|---|
| 41730 | 12/1981 | European Pat. Off. ............ 475/280 |
| 63-145847 | 7/1988 | Japan ............ 475/205 |

*Primary Examiner*—Charles A. Marmor
*Assistant Examiner*—Nathan D. Jensen
*Attorney, Agent, or Firm*—Oblon, Spivak, McClelland, Maier & Neustadt

[57] ABSTRACT

A gear transmission which is enabled to set six forward gear stages by spraying a Ravigneaux planetary gear mechanism and a double-pinion planetary gear mechanism coaxially with an input shaft. The double-pinion planetary gear mechanism and its associated frictional engagement elements are arranged at the side of the input shaft across a partition protruded from the inner face of a casing, whereas the Ravigneaux planetary gear mechanism is arranged at the opposite side to the double-pinion planetary gear mechanism. Moreover, the Ravigneaux planetary gear mechanism has a ring gear acting as an output element, and a counter gear is connected to the ring gear and arranged adjacent to the partition while being supported by the partition.

10 Claims, 3 Drawing Sheets

|       | C11 | C12 | C13 | C14 | B11 | B12 | B13 | F11 | F12 |
|-------|-----|-----|-----|-----|-----|-----|-----|-----|-----|
| 1 ST  | ○   |     |     | ◎   |     | ◎   |     | ○   | ○   |
| 2 ND  | ○   |     |     | ◎   |     |     | ○   |     | ○   |
| 3 RD  | ○   |     |     | ◎   | ○   |     |     |     | ○   |
| 4 TH  | ○   | ○   | ○   | ◎   |     |     |     |     | ○   |
| 5 TH  | △   |     | ○   |     | ○   |     |     |     |     |
| 6 TH  |     |     | ○   |     |     |     | ○   |     |     |
| REV   |     | ○   |     | ○   |     | ○   |     |     |     |

GEAR TRANSMISSION FOR AUTOMATIC TRANSMISSIONS

BACKGROUND OF THE INVENTION

The present invention relates to a gear transmission to be with an automatic transmission for vehicles and, more particularly, to a gear transmission suitable for an automatic transmission of the transverse type having its center axis arranged widthwise of the vehicle.

Since the vehicular automatic transmission is mounted together with the engine in the engine room, it is preferable to be as small and light as possible. In order to improve the power performance and fuel economy, it is also preferable that the number of gear stages to be set is as large as possible. It is, therefore, conceived to adopt a gear transmission which is enabled to set six forward gear stages by using three sets of planetary gear mechanisms, for example, as exemplified in Japanese Patent Laid-Open No. 56746/1991.

Here will be briefly described the gear transmission. As shown in FIG. 4, there are arranged on a common axis an input shaft 1 and an output shaft 2, between which are arranged on a common axis a first planetary gear mechanism 3 of the double-pinion type and second and third planetary gear mechanisms 4 and 5 of the single-pinion type, as recited from the side of the input shaft 1. The carrier 3C of the first planetary gear mechanism 3, the carrier 4C of the second planetary gear mechanism 4 and the ring gear 5R of the third planetary gear mechanism 5 are all connected to rotate together. Moreover, the sun gear 3S of the first planetary gear mechanism 3 and the sun gear 4S of the second planetary gear mechanism 4 are connected to rotate together. Still moreover, the ring gear 4R of the second planetary gear mechanism and the carrier 5C of the third planetary gear mechanism 5 are connected to rotate together, and the output shaft 2 is connected to that carrier 5C.

There are provided a plurality of clutches for connecting the input shaft 1 to a predetermined one of rotary elements. Specifically: a first clutch $C_1$ is interposed between the input shaft 1 and the sun gear 3S of the first planetary gear mechanism 3; a second clutch $C_2$ is interposed between the input shaft 1 and the carrier 4C of the second planetary gear mechanism 3; and a third clutch $C_3$ is interposed between the input shaft 1 and the sun gear 5S of the third planetary gear mechanism 5. Moreover, a fourth clutch $C_4$ and a first one-way clutch $F_1$ are arrayed in series with each other and are arranged in parallel with the third clutch $C_3$.

Here will be described brake means for fixing a predetermined one of the rotary elements. There are provided: a first brake $B_1$ for fixing the sun gear 3S of the first planetary gear mechanism 3 and the sun gear 4S of the second planetary gear mechanism 4 integrated together; a second brake $B_1$ for fixing the ring gear 3R of the first planetary gear mechanism 3; and a third brake $B_3$ for fixing the carrier 3C of the first planetary gear mechanism 3, the carrier 4C of the second planetary gear mechanism 4 and the ring gear 5R of the third planetary gear mechanism 5 integrated altogether. Moreover, a second one-way clutch $F_2$ is disposed in parallel with that third brake $B_3$.

As a result, the gear transmission of the prior art thus constructed is enabled to set six forward and two reverse gear stages by applying/releasing the individual clutches and brakes suitably, thereby to improve the power performance and the fuel economy by the multiple stages.

The gear transmission of the prior art thus far described is constructed such that the input shaft 1 and the output shaft 2 are arranged on a common line while interposing the three sets of planetary gear mechanisms 3, 4 and 5 inbetween. Thus, the gear transmission is suited for an automatic transmission of the so-called "longitudinal type (for rear wheel drive)", in which the gear transmission is arranged longitudinally of the vehicle. In order to apply the gear transmission to the transverse type automatic transmission, however, a pair of counter gears 6a and 6b have to be arranged at the axial end portion, as illustrated by broken lines in FIG. 4, so that the power may be transmitted to a predetermined output member arranged in an axially central portion through a counter shaft 7 connected to those paired counter gears 6a and 6b. This arrangement increases the number of parts to be arranged in the axial direction and accordingly the axial length. As a result, the number of gear stages could be increased, but the entire construction is enlarged to cause a disadvantage that the mountability is deteriorated.

SUMMARY OF THE INVENTION

A main object of the present invention is to provide a gear transmission which can increase the number of gear stages while reducing the size and weight and which can be suited for a transverse type automatic transmission.

Another object of the present invention is to provide a gear transmission which can be easily assembled.

In order to achieve the above-specified objects, according to the present invention, there is provided a gear transmission for an automatic transmission, in which a Ravigneaux planetary gear mechanism having a first sun gear and a ring gear meshing a first pinion and a second sun gear meshing with a second pinion meshing with the first pinion, and a double-pinion planetary gear mechanism are arranged on the same axis as that of an input shaft such that the double-pinion planetary gear mechanism is located at the side of the input shaft whereas the Ravigneaux planetary gear mechanism is located at the opposite side across a partition protruded from the inner face of a casing, in which the first sun gear and the sun gear of the double-pinion planetary gear mechanism are connected to rotate together, in which the carriers of the two planetary gear mechanisms are connected to rotate together, in which a counter gear connected to the ring gear of the Ravigneaux planetary gear mechanism is arranged between the Ravigneaux planetary gear mechanism and the partition, and in which clutch means for connecting the sun gear of the double-pinion planetary gear mechanism and the input shaft, brake means for fixing said sun gear, and another brake means for fixing the ring gear of the double-pinion planetary gear mechanism are arranged closer to the double-pinion planetary gear mechanism than the aforementioned partition.

The gear transmission of the present invention is enabled to set a plurality of gear stages by operating the Ravigneaux planetary gear mechanism exclusively but to set a gear stage of another gear ratio by changing the R.P.M. of the first sun gear or the carrier by the double-pinion planetary gear mechanism. Thanks to the use of the Ravigneaux planetary gear mechanism, moreover, the axial size is reduced, and the ring gear is used as the output element so that the counter gear can be arranged at an axially central portion. Thus, the power need not be transmitted in the so-called "folded-back manner" in the axial direction. Still moreover, the ring gear can be connected directly to the counter gear so that the number of components is reduced to make a small size. Since the counter gear is arranged adjacent to the partition protruded from the casing, it can be easily supported. Furthermore, the frictional engagement elements such as a clutch for connecting the rotary elements of the double-pinion planetary gear mechanism to the input shaft or a brake for fixing a predetermined one of the rotary elements of the planetary gear mechanism are arranged collectively closer to the input shaft than the partition, so that they can be easily assembled. In addition, the parts for transmitting the power between those elements are reduced in number or size so that the entire construction can be small-sized.

The above and further objects and novel features of the present invention will more fully appear from the following detailed description when the same is read with reference to the accompanying drawings. It is to be expressly understood, however, that the drawings are for purpose of illustration only and are not intended as a definition of the limits of the invention.

DESCRIPTION OF THE PREFERRED EMBODIMENTS

Figure 1:
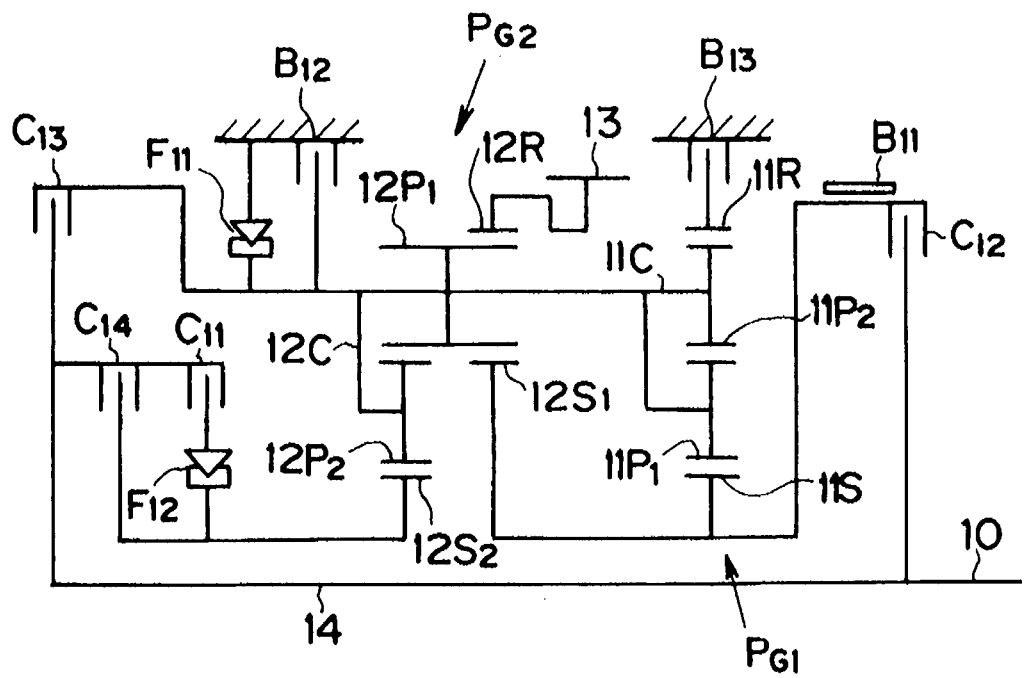
FIG. 1 is a skeleton diagram schematically showing one embodiment of the present invention.
Figure 1:
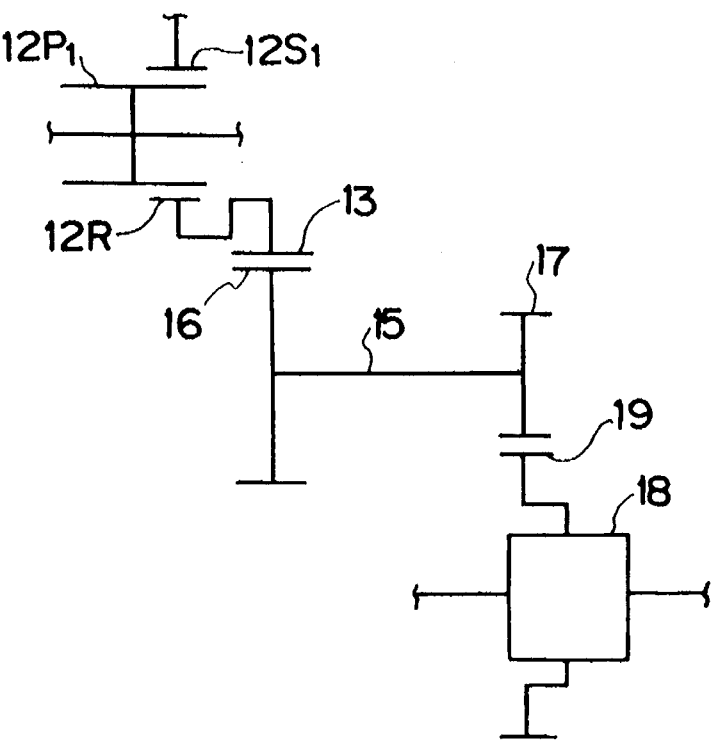

Here will be described the present invention in connection with its embodiments with reference to the accompanying drawings. FIG. 1 is a skeleton diagram showing one embodiment of the present invention, as exemplified by the so-called "transverse type", in which a double-pinion planetary gear mechanism $P_{G1}$ and a Ravigneaux planetary gear mechanism $P_{G2}$ are arrayed on a common axis while having their center line arranged widthwise of the vehicle.

On the same axis as the center line of an input shaft 10 to which is transmitted a power from the (not-shown) torque converter, there are arrayed the double-pinion planetary gear mechanism $P_{G1}$ and the Ravigneaux planetary gear mechanism $P_{G2}$ sequentially in the recited order from the input shaft. Of these, the double-pinion planetary gear mechanism $P_{G1}$ is composed of: a sun gear 11S; a ring gear 11R or an internal gear arranged concentrically of the sun gear 11S; a first pinion 11P$_1$ meshing with the sun gear 11S; a second pinion 11P$_2$ meshing with the first pinion 11P$_1$ and the ring gear 11R; and a carrier 11C holding those pinions 11P$_1$ and 11P$_2$. On the other hand, the Ravigneaux planetary gear mechanism $P_{G2}$ is composed of: first and second sun gears 12S$_1$ and 12S$_2$; a ring gear 12R arranged concentrically of the sun gears 12S$_1$ and 12S$_2$; a first pinion 12P$_2$ meshing with the first sun gear 12S$_1$ and the ring gear 12R; a second pinion 12P$_2$ meshing with the second sun gear 12S$_2$ and the first pinion 12P$_1$; and a carrier 12C holding those pinions 12P$_1$ and 12P$_2$. Moreover, the sun gear 11S of the double-pinion planetary gear mechanism $P_{G1}$ and the aforementioned first sun gear 12S$_1$ are so connected as to rotate integrally with each other, and the carriers 11C and 12C are also so connected as to rotate integrally with each other. Still moreover, a counter gear 13 or an output element is integrally connected to the ring gear 12R of the Ravigneaux planetary gear mechanism $P_{G2}$ and is arranged adjacent to the ring gear 12R and closer to the double-pinion planetary gear mechanism $P_{G1}$ than to the Ravigneaux planetary gear mechanism $P_{G2}$.

The input shaft 10 is connected to an intermediate shaft 14 which is arranged on the extension of the input shaft 10. Between the intermediate shaft 14 and the aforementioned second sun gear 12S$_2$, there are arrayed in series a first clutch $C_{11}$ made of multiple discs and a second one-way clutch $F_{12}$. Between the input shaft 10 and the sun gear 11S of the double-pinion planetary gear mechanism $P_{G1}$, on the other hand, there is arranged a second clutch $C_{12}$ made of multiple discs. Between the intermediate shaft 14 and the carrier 12C of the Ravigneaux planetary gear mechanism $P_{G2}$, there is arranged a third clutch $C_{13}$ are made of multiple discs. Still moreover, a fourth clutch $C_{14}$ made of multiple discs is arranged in parallel with the aforementioned first clutch $C_{11}$ and second one-way clutch $F_{12}$.

As brake means, furthermore, there are provided: a first brake $B_{11}$ acting as a band brake for fixing the sun gear 11S of the double-pinion planetary gear mechanism $P_{G1}$ and the first sun gear 12S$_1$ of the Ravigneaux planetary gear mechanism $P_{G2}$ selectively; a second brake $B_{12}$ made of multiple discs for fixing the carriers 11C and 12C selectively; a one-way clutch $F_{11}$ arranged in parallel with the second brake $B_{12}$; and a third brake $B_{13}$ made of multiple discs for fixing the ring gear 11R of the double-pinion planetary gear mechanism $P_{G1}$ selectively. Incidentally, the arrangements and positions of those frictional engagement elements will be described hereinafter.

The aforementioned counter gear 13 is in meshing engagement with a counter-driven gear 16 which is fixed on a counter shaft 15 arranged in parallel with the aforementioned intermediate shaft 14, and a drive gear 17 fixed on the other end portion of that counter shaft 15 is in meshing engagement with a ring gear 19 in a front differential 18.

Figure 2:
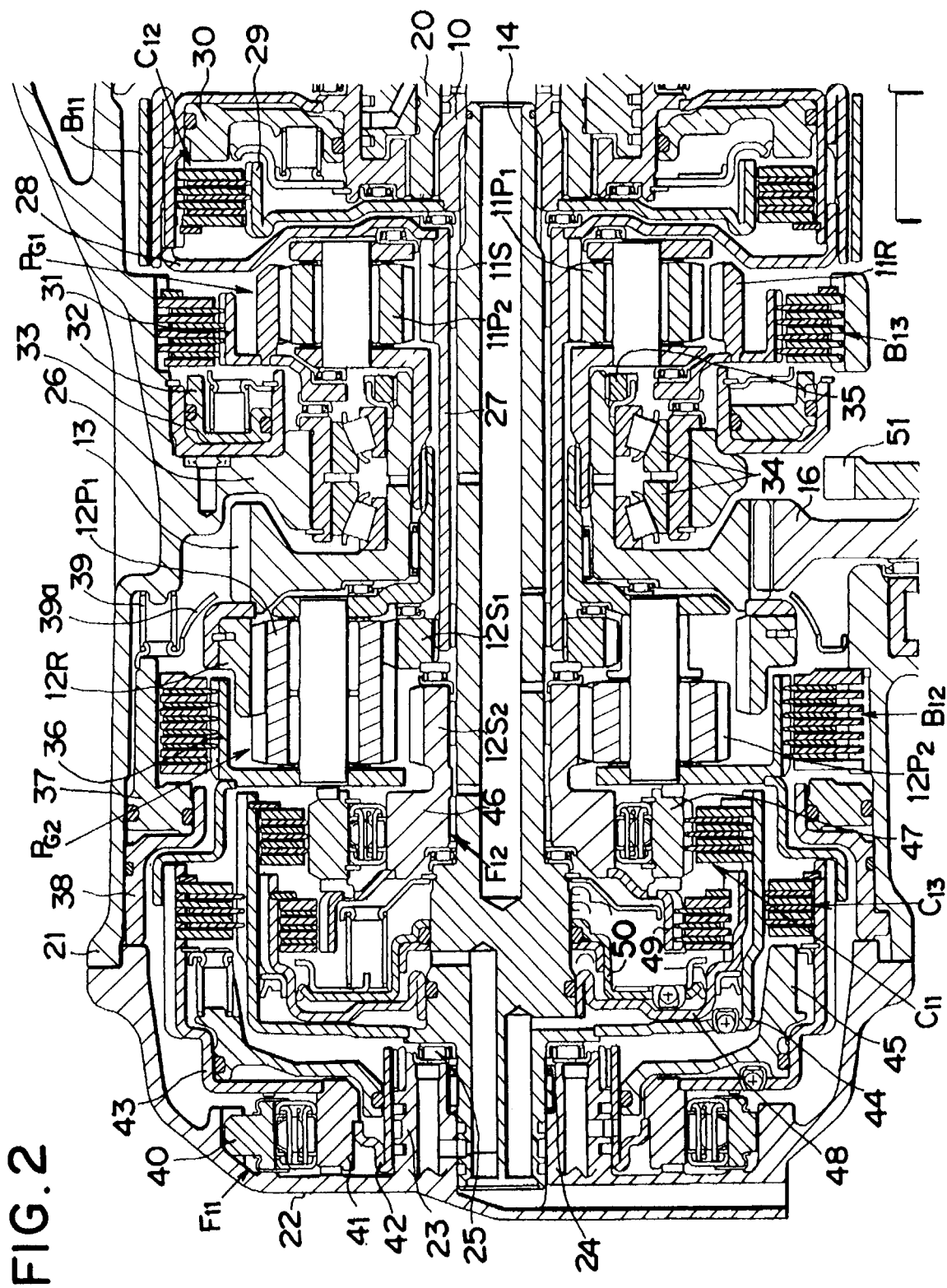
FIG. 2 is a section showing a portion of the embodiment of the present invention more specifically.

FIG. 2 is a section showing a portion of the above-described gear transmission more specifically. The input shaft 10 is rotatably arranged in the inner circumference of a stationary shaft 20 for the stator, and the intermediate shaft 14 has its one end portion inserted and splined in the leading end portion of the input shaft 10. The other end portion of the intermediate shaft 14 is inserted into the boss 23 of an end cover 22 which is mounted on the end portion of a casing 21 and is so supported by bearings 24 and 25 as to rotate in radial and thrust directions. The casing 21 is formed at its axially central portion with an annular partition 26 around the axis of the intermediate shaft 14. Across the partition 26, there are arranged the double-pinion planetary gear mechanism $P_{G1}$ at the side of the input shaft 10 and the Ravigneaux planetary gear mechanism $P_{G2}$ at the opposite side.

A sun gear shaft 27 is a hollow shaft fitted rotatably in the outer circumference of the intermediate shaft 14 and is formed on the outer circumference of its one end with the sun gear 11S of the double-pinion planetary gear mechanism $P_{G1}$. On the other end portion of the sun gear shaft 27, on the other hand, there is splined the first sun gear 12S$_1$ of the Ravigneaux planetary gear mechanism $P_{G1}$. On the end portion of the sun gear shaft 27, as located at the side of the sun gear 11S (or the input shaft 10), there is fixed a clutch drum 28 for the second clutch $C_{12}$. A plurality of frictional discs of a first set are splined on the inner circumference of that clutch drum 28, and frictional discs of a second set are arranged alternately of the frictional discs of the first set and are splined on a clutch hub 29 which is arranged on a common circle inside of the clutch drum 28. Moreover, the clutch hub 29 is fixed on the leading end portion of the input shaft 10. Still moreover, a piston 30 for pushing the frictional discs of the second clutch $C_{12}$ into engagement is so fixed in the annular portion (or cylinder portion) formed in the clutch drum 28 as to move back and forth. Furthermore, the first brake $B_{11}$ acting as the band brake is arranged around the outer circumference of the clutch drum 28.

Around the outer circumference of the double-pinion planetary gear mechanism $P_{G1}$, moreover, there is arranged brake hub 31 of the third brake $B_{13}$. Frictional discs of one set are splined in the outer circumference of the brake hub 31, and frictional discs of the other set are arranged alternately of the former frictional discs and are splined to the inner face of the casing 21. These frictional discs constitute the third brake $B_{13}$. A piston 32 for applying the brake $B_{13}$ is fitted to move back and force in an annular cylinder member 33 which is fitted in the aforementioned partition 26.

The individual carriers 11C and 12C off the planetary gear mechanisms $P_{G1}$ and $P_{G2}$ have their bosses extended around the aforementioned sun gear shaft 27 and splined to each other. Around those bosses, moreover, there is extended the boss of the counter gear 13, which is supported by the aforementioned partition 26 by arranging a bearing 34 between its boss and the inner circumference of the partition 26. Incidentally, the counter gear 13 has its boss extended toward the double-pinion planetary gear mechanism $P_{G1}$, and a lock nut 35 for fixing the bearing 34 is fitted in the inner circumference of the flange of the ring gear of the double-pinion planetary gear mechanism $P_{G1}$ and on the end portion of the boss of the counter gear 13.

At the opposite side of the aforementioned partition 26 across the counter gear 13, there is arranged the Ravigneaux planetary gear mechanism $P_{G2}$. Around the outer circumference of the Ravigneaux planetary gear mechanism $P_{G2}$, there is arranged the second brake $B_{12}$. Specifically, frictional discs of one set are splined in the portion of the inner circumference of the casing 21 around the outer circumference of the Ravigneaux planetary gear mechanism $P_{G2}$, and frictional discs of the other set are arrayed alternately of the frictional discs of the former set and are splined to a brake hub 36 which is arranged close to the ring gear 12R. Moreover, this brake hub 36 is connected to the carrier 12C. Still moreover, a piston 37 for applying the second brake B12 is fitted to move back and forth in the annular cylinder portion which is formed by the inner circumference of the casing 21 and a holding member 38 fitted on the inner circumference of the casing 21. Incidentally, the piston 37 has its portion extended through the frictional discs of the second brake B12 to the opposite side, and a return spring 39 is arranged between the leading end portion of the piston 37 and the inner face of the casing 21. Moreover, the return spring 39 has its seat 39a extended up to the outer circumference end of the counter gear 13 so that the oil agitated by the counter gear 13 can be prevented from influencing the Ravigneaux planetary gear mechanism $P_{G2}$.

The first one-way clutch $F_{11}$ in parallel with that second brake $B_{12}$ is accommodated in the end cover 22. This one-way clutch $F_{11}$ has its outer race 40 splined in the inner circumference of the end cover 22 and its inner race 41 rotatably held in the outer circumference of the boss 23 through a retainer 42. The inner race 41 and the aforementioned brake hub 36 of the second brake B12 are connected to each other by a connecting drum 43. In this connecting drum 43, moreover, there are arranged the first, third and fourth clutches $C_{11}$, $C_{13}$ and $C_{14}$ and the second one-way clutch $F_{12}$.

On the intermediate shaft 14, there is fitted a clutch hub 44 which is generally recessed to have an outer circumference in parallel with the inner circumference of the connecting drum 43, and there are alternately arranged two sets of frictional discs which are individually splined in the outer circumference of the clutch hub 44 and on the inner circumference of the connecting drum 43. Specifically, this connecting drum 43 acts as the clutch drum which is formed with the third clutch $C_{13}$. This third clutch $C_{13}$ is applied by a piston 45 which is so fitted in the connecting drum 43 as to slide back and forth on the aforementioned retainer 42 and in the inner circumference of the connecting drum 43.

The aforementioned clutch hub 44 has its leading end portion extended to a position near the Ravigneaux planetary gear mechanism $P_{G2}$ so that its inner circumference acts as the clutch drum of the first clutch $C_{11}$. Specifically, there is arranged adjacent to the Ravigneaux planetary gear mechanism $P_{G2}$ the second one-way clutch $F_{12}$ which has its inner face 46 integrated with the second sun gear $12S_2$ of the Ravigneaux planetary gear mechanism $P_2$ and its outer race 47 acting as the hub of the first clutch $C_{11}$. Two sets of frictional discs are arranged alternately of each other and are splined in the outer circumference of the outer race 47 and on the inner circumference of the leading end of the clutch hub 44.

In this clutch hub 44, there is so fitted at the opposite side to the Ravigneaux planetary gear mechanism $P_{G2}$ across the second one-way clutch $F_{12}$ a first clutch piston 48 as to move back and forth. This clutch piston 48 is given a smaller recessed section than that of the clutch hub 44. The piston 48 has its leading end acting as the clutch drum of the fourth clutch $C_{14}$ at its inner circumference, which is radially confronted by a clutch hub 49, and this clutch hub 49 is connected to the inner race 46 of the second one-way clutch $F_{12}$. Moreover, a piston 50 for applying the fourth clutch $C_{11}$ is so fitted in the first clutch piston 48 as to move back and forth. Incidentally, reference numeral 51 appearing in FIG. 2 designates a parking gear which is integrated with the counter-driven gear 16.

Figures 3, 4:
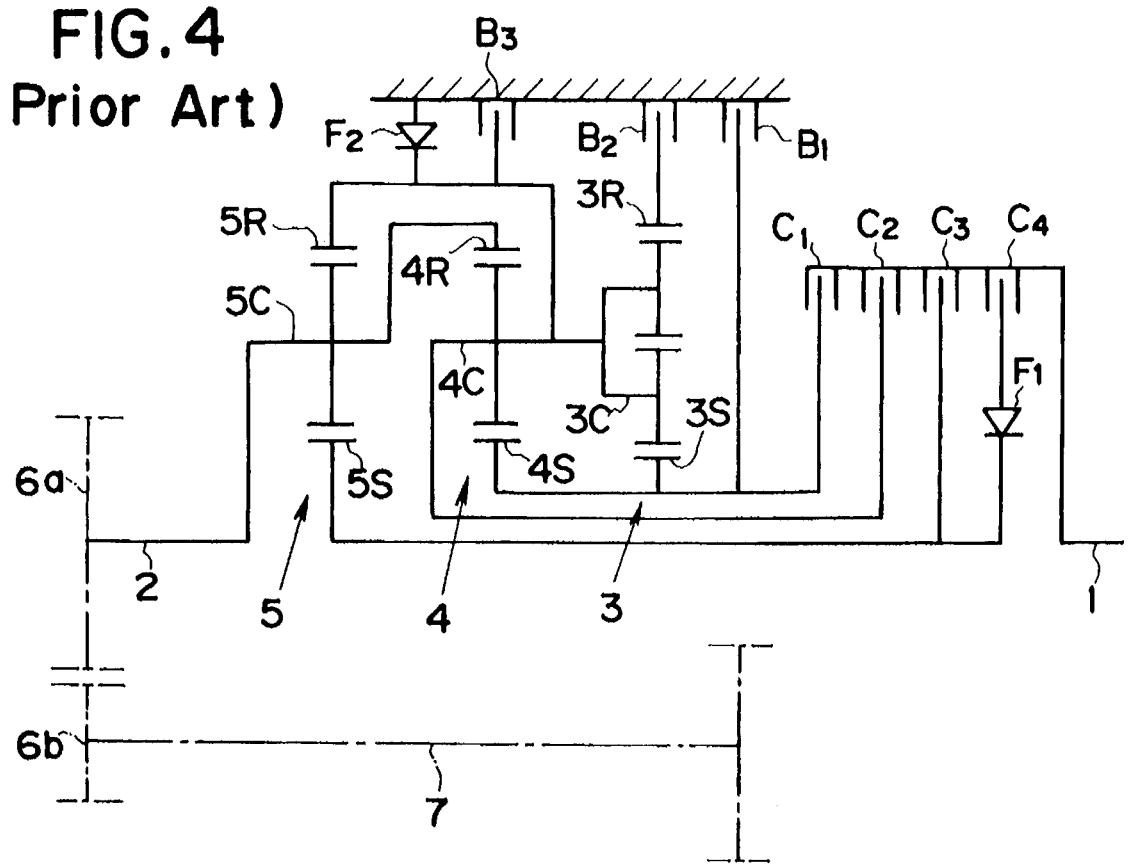
FIG. 3 is a clutch/brake application chart for setting one of the gear stages of the embodiment of the present invention.
FIG. 4 is a skeleton diagram showing one example of the gear transmission of the prior art.

In the gear transmission thus far described, six forward and one reverse gear stages are set by applying/releasing the individual frictional engagement elements, as tabulated in FIG. 3. In FIG. 3: symbol o indicates the applied state; blanks indicate the released state; symbol ⊙ indicates the applied state in case an engine braking is to be effected; and symbol Λ indicates the applied or released state.

First of all the 1st speed will be briefly described in the following. The 1st speed is set, when the first and second one-way clutches $F_{11}$ and $F_{12}$ are applied as the first clutch $C_{11}$ is applied. Specifically, the Ravigneaux planetary gear mechanism $P_{G2}$ has its second sun gear $12S_2$ rotated together with the input shaft 10 but its carrier 12C fixed. As a result, the ring gear 12R acting as the output element rotates forward (i.e., in the same direction as that of the input shaft 10) at the R.P.M. which is decelerated at the ratio of the tooth numbers between the second sun gear $12S_2$ and the ring gear 12R from the R.P.M. of the second sun gear $12S_2$. In case the engine braking is to be effected, on the other hand, there are applied the second brake $B_{12}$ and the fourth clutch $C_{14}$, which are in parallel relation to the individual one-way clutches $F_{11}$ and $F_{12}$.

The 2nd speed is set, when the second one-way clutch $F_{12}$ is applied as the first clutch $C_{11}$ and the third brake $B_{13}$ are applied. Specifically, the second sun gear $12S_2$ acts as the input element whereas the ring gear 11R of the double-pinion planetary gear mechanism $P_{G1}$ acts as the reaction element. Thus, the double-pinion planetary gear mechanism $P_{G1}$ has its sun gear 11S rotated backward (i.e., in the opposite direction to the input shaft 10) and its carrier 11C rotated forward but at a lower speed than the input shaft 10. As a result, the Ravigneaux planetary gear mechanism $P_{G2}$ has its sun gear $12S_2$ rotated together with the input shaft 10 and its carrier 12C rotated forward at a low speed so that its ring gear 12R rotates forward at a higher speed than that of the speed. Hence, the gear ratio of tills 2nd speed takes the value which is determined by the two gear ratios, i.e., the gear ratio (i.e., the ratio of the tooth numbers between the sun gear 118 and the ring gear 11R) of the double-pinion planetary gear mechanism $P_{G1}$ and the gear ratio of the Ravigneaux planetary gear mechanism $P_{G2}$. Incidentally, the fourth clutch $C_{14}$ in parallel with the second one-way clutch $F_{12}$ is applied when the engine braking is to be applied.

The 3rd speed set, when the second one-way clutch $F_{11}$ is applied as the first clutch $C_{11}$ and the first brake $B_{11}$ are applied. Specifically, the second sun gear $12S_2$ acts as the input element whereas the first sun gear $12S_1$ acts as the reaction element. As a result, the carrier 12C and the first sun gear $12S_1$ are going to be rotated backward by the load coming from the ring gear 12R acting as the output element. Since, however, the first sun gear $12S_1$ is fixed, its reaction rotates the carrier 12C at a lower speed than that of the input shaft 10 so that the ring gear 12R rotates at a higher speed than that of the 2nd speed. The gear ratio of this 3rd speed takes the value which is determined by the two gear ratios of the Ravigneaux planetary gear mechanism $P_{G2}$. Incidentally, in this case, too, the fourth clutch $C_{14}$ in parallel with the second one-way clutch $F_{12}$ is applied to effect the engine braking.

The 4th speed is set, when the second one-way clutch $F_{12}$ is applied as the first to third clutches $C_{11}$, $C_{12}$ and $C_{13}$ are applied. In the Ravigneaux planetary gear mechanism $P_{G2}$, therefore the three elements, i.e., the two sun gears $12S_1$ and $12S_2$ and the carrier 12C act as the input elements so that they rotate altogether. Specifically, the ring gear acting as the output element rotates forward at the same speed as that of the input shaft 10 to establish the so-called "direct drive stage". In this case, too, the fourth clutch $C_{14}$ in parallel with the second one-way clutch $F_{12}$ is applied to effect the engine braking.

The 5th speed is set by applying the third clutch $C_{13}$ and the first brake $B_{11}$. Specifically, the Ravigneaux planetary gear mechanism $P_{G2}$ has its carrier 12C set as the input element and its first sun gear $12S_1$ set as the reaction element. As a result, the ring gear 12R is accelerated to turn forward with respect to the carrier 12C so that its gear ratio takes a value according to the ratio of the tooth number between the first sun gear $12S_1$ and the ring gear 12R. Since, at this 5th speed, the second sun gear $12S_2$ rotates forward at a higher speed than that of the input shaft 10 whereas the second one-way clutch $F_{12}$, the first clutch $C_{11}$ may be either applied or released.

The 6th speed is set by applying the third clutch $C_{13}$ a and the third brake $B_{13}$. Specifically, the carriers 11C and 12C act as the input elements whereas the ring gear 11R of the double-pinion planetary gear mechanism $P_{G1}$ acts as the reaction element. In the double-pinion planetary gear mechanism $P_{G1}$, therefore, the ring gear 11R is fixed to allow the carrier 11C to rotate together with the input shaft 10 so that the sun gear 11S rotates backward at a high speed. In the Ravigneaux planetary gear mechanism $P_{G2}$, therefore, the carrier 12C rotates together with the input shaft 10 while the first sun gear $12S_1$ being rotating backward at a high speed, so that the ring gear 12R rotates forward at a higher speed than that of the 5th speed at which the first sun gear $12S_1$ is fixed. The gear ratio of this 6th takes the value which is determined on the basis of the gear ratio of the double-pinion planetary gear mechanism $P_{G1}$ and the ratio of the tooth number between the first sun gear $12S_1$ and the ring gear 12R of the Ravigneaux planetary gear mechanism $P_{G2}$.

The reverse gear stage is set by applying the second clutch $C_{12}$ and the second brake $B_{12}$. As a result, the Ravigneaux planetary gear mechanism $P_{G2}$ has its sun gear $12S_1$ acting as the input element and its carrier 12C acting as the reaction element so that its ring gear 12R is rotated backward through the first pinion $12P_1$. The gear ratio of the reverse gear stage takes the value which is determined on the basis of the tooth numbers between the first sun gear $12S_1$ and the ring gear 12R.

Of these various gear stages, brake $B_{13}$ of the double-pinion planetary gear mechanism $PG_1$ is used in the 2nd and 6th speeds. As clearly seen from the construction shown in FIG. 2, the double-pinion planetary gear mechanism $P_{G1}$ and the third brake $B_{13}$ a for fixing the ring gear 11R of the planetary gear mechanism are arranged in such a portion in the casing 21 as is partitioned by the partition 26, but they may be eliminated. In other words, the gear transmission thus far described can be assembled for a compact construction into a six- or four-speed transmission. If, moreover, the function for setting the 6th speed, the construction can also be made for an automatic transmission having five gear stages. Moreover, a low-cost automatic transmission for three gear stages can be constructed by eliminating the clutch $C_{13}$. Thus, the construction of the present invention can be made versatile for covering three to six speeds. For this purpose, the clutch $C_{13}$ can be removed without the remaining parts to construct a compact automatic transmission capable of setting the three to six gear stages.

Here will be generally described the advantages to be obtained by the present invention. The gear transmission of the present invention is enabled to set a predetermined number of gear stages by changing the R.P.M. of the first sun gear and the carrier of the Ravigneaux planetary gear mechanism by the double-pinion planetary gear mechanism. As a result, the number of gear stages to be set can be increased for multiple stages. By using the Ravigneaux planetary gear mechanism, moreover, the total axial size can be reduced to provide a construction suited for the so-called "transverse type automatic transmission". Still moreover, the counter gear acting as the output member is directly connected to the ring gear of the Ravigneaux planetary gear mechanism so that it can be arranged generally at an axial central portion in the entirety of the gear transmission. As a result, neither any mechanism nor any member for folding back the construction is required so that the gear transmission can be reduced in its size and weight as a whole. Furthermore, the counter gear is supported by the partition projected from the casing, and the double-pinion planetary gear mechanism and its relating frictional engagement elements are arranged at the side of the input shaft across the partition whereas the Ravigneaux planetary gear mechanism and its relating frictional engagement elements are arranged at the other side across the partition. As a result, the assembling properties can be improved to reduce the size of the entire structure.

What is claimed is:

1. A gear transmission for an automatic transmission, comprising:

an input shaft;

a double-pinion planetary gear mechanism arranged coaxially with and adjacent to said input shaft and including: a sun gear; a ring gear arranged concentrically with said sun gear; a pair of pinions meshing with each other and arranged between said sun gear and said ring gear; and a carrier holding said paired pinions;

a partition protruding from the inner face of a casing and arranged adjacent to said double-pinion planetary gear mechanism;

a Ravigneaux planetary gear mechanism arranged coaxially with said input shaft and at the opposite side to said double-pinion planetary gear mechanism across said partition and including: first and second sun gears; a ring gear; a first pinion meshing with said first sun gear and said ring gear; a second pinion meshing with said second sun gear and said first pinion; and a carrier holding said first and second pinions;

a counter gear arranged radially between said Ravigneaux planetary gear mechanism and said partition for rotating integrally with the ring gear of said Ravigneaux planetary gear mechanism;

clutch means arranged closer to said double-pinion planetary gear mechanism than said partition;

brake means arranged closer to said double-pinion planetary gear mechanism than said partition for fixing the sun gear of the double-pinion planetary gear mechanism; and another brake means arranged closer to said double-pinion planetary gear mechanism closer to said partition for fixing the ring gear of said double-pinion planetary gear mechanism, wherein said first sun gear and the sun gear of said double-pinion planetary gear mechanism are connected to rotate integrally with each other, and wherein the carriers of said two planetary gear mechanisms are connected to rotate integrally with each other.

2. A gear transmission for an automatic transmission, according to claim 1, further comprising:

a bearing fixed in the inner circumference of said partition for supporting said counter gear rotatably.

3. A gear transmission for an automatic transmission, according to claim 1, further comprising clutch means for connecting said input shaft and said integrally connected carriers selectively.

4. A gear transmission for an automatic transmission, according to claim 1, further comprising brake means for fixing said integrally connected carriers with respect to said casing.

5. A gear transmission for an automatic transmission, according to claim 4, wherein said carrier fixing brake means includes: a multi-disc brake; and a one-way clutch arranged in parallel with said multi-disc brake.

6. A gear transmission for an automatic transmission, according to claim 1, further comprising clutch means for connecting said second sun gear and said input shaft selectively.

7. A gear transmission for an automatic transmission, according to claim 6, wherein said clutch means for connecting said second sun gear and said input shaft selectively includes: a multi-disc clutch interposed between said second sun gear and said input shaft; and another multi-disc clutch and a one-way clutch arrayed in series with each other between said second sun gear and said input shaft.

8. A gear transmission for an automatic transmission, according to claim 1, further comprising:

a counter shaft adapted to be rotated by said counter gear; and a front differential for having a torque transmitted from said counter shaft.

9. A gear transmission for an automatic transmission, according to claim 1, further comprising a cover member for shielding the ring gear of said Ravigneaux planetary gear mechanism from the lubricating oil which is agitated by said counter gear.

10. A gear transmission for an automatic transmission, according to claim 9, further comprising:

a return spring arranged axially on the outer circumference of said Ravigneaux planetary gear mechanism and in the outer circumference of said casing; and a seat attached to the free end of said return spring, wherein said cover member is integrated with said seat.

* * * * *

UNITED STATES PATENT AND TRADEMARK OFFICE
CERTIFICATE OF CORRECTION

PATENT NO. : 5,525,117
DATED : June 11, 1996
INVENTOR(S) : Kunio Morisawa et al

It is certified that error appears in the above-indentified patent and that said Letters Patent is hereby corrected as shown below:

Claim 5, line 1, change "For" to --for--.

Signed and Sealed this

Eleventh Day of March, 1997

Attest:

BRUCE LEHMAN

*Attesting Officer*     *Commissioner of Patents and Trademarks*